April 2, 1963     J. W. HUNKELER     3,084,088
METHOD OF FORMING A BITUMINOUS COATED GLASS FIBER PIPE
Filed Dec. 15, 1958
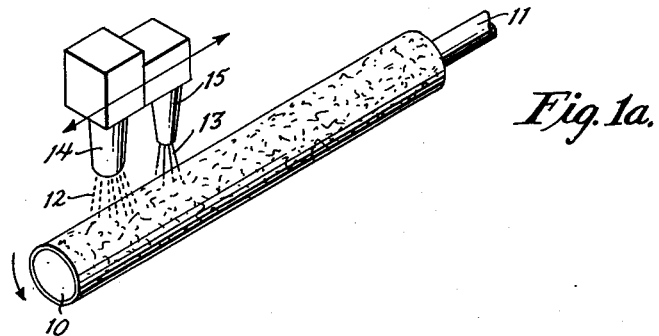
*Fig. 1a.*
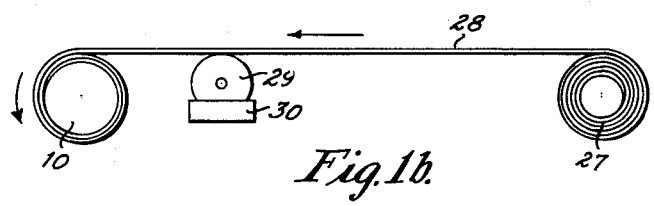
*Fig. 1b.*
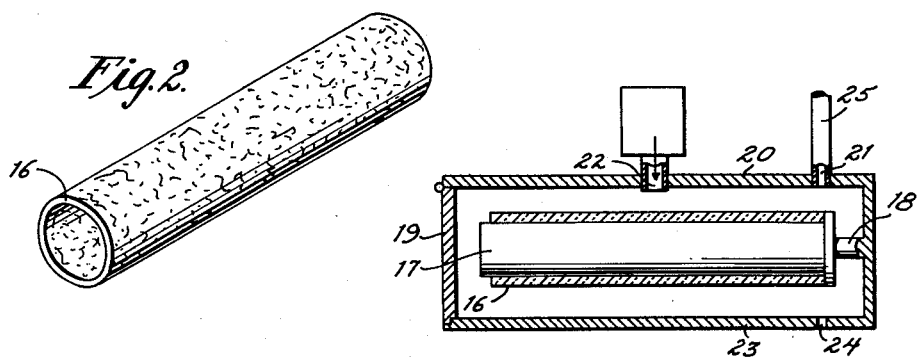
*Fig. 2.*     *Fig. 3.*
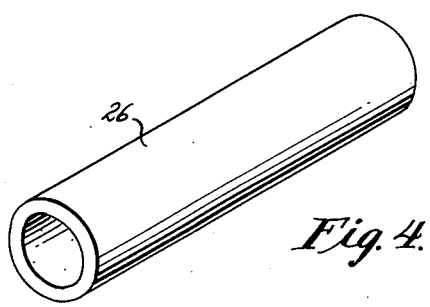
*Fig. 4.*
INVENTOR.
JULES HUNKELER
BY
ATTORNEY.

3,084,088
METHOD OF FORMING A BITUMINOUS COATED GLASS FIBER PIPE
Jules W. Hunkeler, Edmonton, Alberta, Canada, assignor to Perma Tubes Ltd., Edmonton, Alberta, Canada, a corporation of Canada
Filed Dec. 15, 1958, Ser. No. 780,584
1 Claim. (Cl. 156—167)

The present invention relates to a pipe that is made of glass fibres and a bitumen, and is concerned with such a pipe that has the property of durability to a high degree and may be produced at a low cost.

Prior to the advent of this invention it has been proposed to make a pipe or conduit of Fiberglas, together with a bonding agent such as a plastic in the nature of a thermosetting resin. However, the known products and methods consist essentially of winding long fibres circumferentially in superposed layers after immersion in a binder and seasoning or curing of the bonded mass of fibrous layers and binder, after forming, by subjecting it to heat or moisture.

The present invention has in view as its foremost objective the provision of pipe or conduit that consists essentially of a glass fiber mat core that is completely impregnated with a bitumen such as asphalt or coal tar.

Another highly important object of the present invention is to provide a new and improved method for producing a pipe having the above-noted characteristics.

More in detail, the invention has as an object the provision of a method of producing a bitumen glass fiber pipe which includes as an initial and characteristic step the forming of a glass fiber mat core, and as a second and essential step the impregnating of this core with a bitumen to completely fill the voids and interstices between the glass fibers so as to achieve a solid-wall construction.

Another object in view is to provide a method of producing the glass fiber core which consists of spraying glass fibers onto a mandrel, together with an appropriate adhesive, to achieve a form-sustaining body in the core.

Another object in view is to provide an alternative method of forming the glass fiber mat core which involves wrapping glass fibers which have been treated with an adhesive on a mandrel.

Another highly important object of the invention is to provide a method of the character aforesaid in which the impregnation is achieved by introducing the formed glass fiber mat core into an autoclave, exhausting air therefrom, and then introducing the bitumen under pressure into the autoclave to completely impregnate the glass fiber mat core.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a bituminous glass fiber pipe having a solid-wall construction, together with the method of producing the same which consists essentially of forming the core on a mandrel, using an adhesive to achieve the sustaining body, and then impregnating the formed core with asphalt in an autoclave by exhausting air therefrom and introducing bitumen under pressure thereinto.

For a full and more complete understanding of the invention, reference may be had to the following description and accompanying drawing, wherein:

FIGURE 1a is a diagrammatic perspective view illustrating one way of achieving the first step of the process;

FIGURE 1b is a diagrammatic side view depicting an alternate way of achieving the first step of the method;

FIGURE 2 is a perspective of a formed core;

FIGURE 3 is a side view, largely in section and highly diagrammatic, depicting a formed core as positioned on a mandrel in an autoclave; and FIGURE 4 is a perspective view of a finished pipe that is made in accordance with the precepts and method of this invention.

Before referring to the drawing and describing the method of this invention in detail, it is highly important to note that the invention is described in conjunction with a pipe or conduit that is made of glass fibers and a bitumen.

However, it is to be clearly understood that the glass fibers might be supplemented by the incorporation of wire mesh, glass cloth, woven fabric, or any other materials that are added for the purpose of adding strength, rigidity, or other properties to the pipe.

Referring now to the drawing, and first more particularly to FIGURE 1a, a mandrel 10 is shown as mounted on a spindle 11 which imparts rotation thereto in a desired direction and at a desired speed. As the mandrel 10 is rotated, glass fibers, represented at 12, are blown thereonto. At the same time, an adhesive, such as an appropriate thermosetting resin in liquid form, is sprayed onto the fibers, with the resin being represented at 13. It will be understood that there are many thermosetting resins which will be found suitable for this purpose. Examples of such resins are shown in the patent to Ganahl et al., No. 2,714,414, dated August 2, 1955.

As depicted in FIGURE 1a, the glass fibers 12 are blown from a nozzle 14 which is movable along the mandrel, while the thermosetting resin 13 is sprayed from a nozzle 15 which is also movable along the mandrel. The arrangement depicted in the drawing is merely illustrative of only one way of blowing the glass fibers onto the mandrel. Obviously, nozzles having a length equal to the mandrel could just as well be utilized.

The deposit of the glass fibers, together with the thermosetting resin, is continued with the mandrel rotating until a desired thickness is built up in the wall structure.

At this point a core, such as represented at 16 in FIGURE 2, is achieved. This core may be removed from the mandrel 10 because it has a self-sustaining body and will hold its shape. However, it comprises a body structure which consists largely of voids and interstices between the glass fibers. An autoclave is illustrated diagrammatically in FIGURE 3 and includes a second mandrel 17 that is supported from a wall thereof as indicated at 18. Opposite to the mandrel 17 there is a door 19 which may be opened. The autoclave includes a top wall 20 formed with an air-exhaust port at 21 and an inlet port at 22 for a bitumen. It also includes a bottom wall 23 formed with a drain outlet 24.

The door 19 is first opened and the core 16 placed on the mandrel 17, whereupon the door is closed. Air is now exhausted from the interior of the autoclave by an appropriate air pump connected to the line 25, which communicates with the air exhaust 21. After a desired degree of vacuum is achieved within the autoclave, the exhaust port is closed and a molten bitumen, such as asphalt at a temperature of 420° F., is introduced through the port 22. This bitumen is introduced under pressure so as to completely fill the interior of the autoclave and be forced into the voids and interstices in the core 16. Thus the core 16 is completely and thoroughly impregnated with the bitumen to achieve a solid-wall construction.

The core 16 is left in the autoclave a sufficient length of time to insure of a complete penetration and saturation of the core 16 to fill all the voids of the wall structure therein. Surplus liquid asphalt may then be withdrawn through the drain 24 and the door 19 opened, whereupon the finished pipe is withdrawn from the mandrel 17 and allowed to cool to ambient temperature. This results in a finished pipe such as represented at 26 in FIGURE 4. This finished pipe 26 will have a solid-wall structure completely devoid of all spaces, gaps, voids, or interstices. It has high properties of durability and is particularly adapted for use as a soil pipe.

It is evident that a length of the pipe shown at 26 in FIGURE 4 may have its ends machined to a taper so that the ends of one pipe may interfit with the ends of another pipe. Also, couplings, elbows, and T's may be made of the same material and by the same method and used to join several lengths of the pipe together.

While the foregoing method has been described in conjunction with asphalt, it is to be clearly understood that it is equally susceptible of use with coal tar.

An alternative method of achieving the formed core 16 is depicted in FIGURE 1b. As shown therein, the mandrel 10 is rotated from the spindle 11 exactly as above described. However, a supply of glass fibers in the form of a roll 27 is employed. The glass fibers are drawn from the roll 27 as a strip 28 which passes over a roll 29. The lower portion of the roll 29 is immersed in a pan 30 containing thermosetting resin so as to pick up the thermosetting resin and deliver it to the strip of glass fibers. Thus, as this strip is wound about the mandrel 10 the core is built up and held in the form-sustaining shape by the thermosetting resin. This method results in the formation of a core that is in every sense comparable to the core 16 which is impregnated with the bitumen as described above in connection with the completion of the method.

The asphalt employed in the method is preferably one having a high softening point to assure of complete penetration. It is notable that this method is capable of producing pipes having a wall thickness within a wide range, as well as pipe of diameters within a wide range. The particular diameter and wall thickness will depend upon the particular conditions of usage which the pipe is intended to accommodate. As one example, it may be noted a pipe having an outside diameter of about 4½" and a wall thickness of 5/16" may be made by this method and will have all the properties, qualities, and attributes required of soil pipe.

While a preferred specific embodiment of the invention is hereinbefore set forth, it is to be clearly understood that the invention is not to be limited to the exact materials, steps, and apparatus illustrated and described, because various modifications of these details may be made in putting the invention into practice within the purview of the appended claim, such as the addition of a mineral filler to the asphalt.

What is claimed is:

In the production of bituminous glass fiber pipe, the method comprising the steps of: (a) simultaneously depositing glass fibers and a thermosetting resin in liquid form on a rotating mandrel to build up a foraminous core of a desired thickness thereon with the major portion of said core consisting of voids and interstices between the fibers, (b) removing said core from said mandrel, (c) placing said core on a second mandrel disposed within an airtight closed chamber, (d) exhausting air from said chamber to create a vacuum therein, (e) delivering molten bitumen under pressure to said chamber to completely fill the chamber and thoroughly impregnate said core and completely fill said voids and interstices with said bitumen, (f) drawing excess bitumen from said chamber, and (g) removing said impregnated core from said second mandrel.

References Cited in the file of this patent

UNITED STATES PATENTS

| | | |
|---|---|---|
| 1,582,084 | Richter et al. | Apr. 27, 1926 |
| 1,937,417 | Wallace | Nov. 28, 1933 |
| 1,956,866 | Keller | May 1, 1934 |
| 2,012,970 | Miller | Sept. 3, 1935 |
| 2,331,146 | Slayter | Oct. 5, 1943 |
| 2,370,193 | Reid | Feb. 27, 1945 |
| 2,413,551 | Englund | Dec. 31, 1946 |
| 2,471,330 | Knight et al. | May 24, 1949 |
| 2,552,599 | Stout | May 15, 1951 |
| 2,614,058 | Francis | Oct. 14, 1952 |
| 2,773,287 | Stout | Dec. 11, 1956 |
| 2,870,793 | Bailey | Jan. 27, 1959 |